Figure 1:
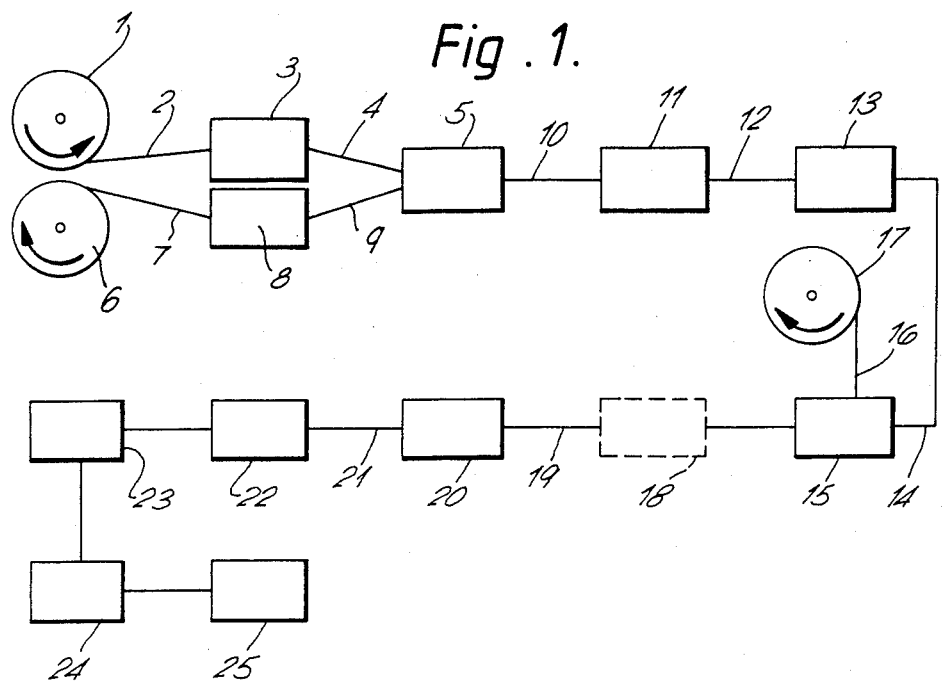

United States Patent [19]

Pedersen et al.

[11] Patent Number: 4,518,445

[45] Date of Patent: May 21, 1985

[54] METHOD FOR MAKING ELECTRICAL CABLES

[75] Inventors: Jack R. Pedersen, Moss; Sigmund Ege, Oslo, both of Norway

[73] Assignee: International Standard Electric Corporation, New York, N.Y.

[21] Appl. No.: 586,530

[22] Filed: Mar. 5, 1984

[30] Foreign Application Priority Data

Mar. 7, 1983 [NO] Norway ................................. 830769

[51] Int. Cl.³ ......................... B21F 15/06; B21F 15/08
[52] U.S. Cl. ........................................ 156/49; 29/868;
156/150; 156/158; 156/165; 228/263.18; 228/904
[58] Field of Search ...................... 29/868; 156/49, 158, 156/150, 165; 228/1 A, 110, 227, 263.18, 904; 219/85 R, 85 F, 104, 106

[56] References Cited

U.S. PATENT DOCUMENTS

| | | | |
|---|---|---|---|
| 3,384,283 | 5/1968 | Mims | 228/110 |
| 3,517,150 | 6/1970 | McIntosh et al. | 174/84 R X |
| 4,032,380 | 6/1977 | Olsson | 156/49 |
| 4,246,438 | 1/1981 | Gozlan | 29/868 X |
| 4,484,022 | 11/1984 | Ekentropp | 156/49 X |

Primary Examiner—Robert A. Dawson
Attorney, Agent, or Firm—John T. O'Halloran; Peter R. Ruzek; Mary C. Werner

[57] ABSTRACT

This invention relates to continuous manufacturing of insulated wire and conductor, and in particular to heating cables having "cold ends". A process is described by which predetermined lengths of resistance conductor (4) and of cold end conductor (9) are continuously and alternatively jointed together. After insulation and provision of additional protective sheats the continuous composite conductor is cut into cold end heating cables. A conductor jointing process is described.

14 Claims, 2 Drawing Figures

METHOD FOR MAKING ELECTRICAL CABLES

The present invention relates to a method for continuous manufacturing of insulated wire or conductor including the steps of joining sections of the wire/conductor end to end and passing the continuous conductor through at least one insulation and protective sheath applicator (11, 13, 15, 18) to provide at least one uninterrupted layer over the conductor.

The present invention relates in particular to a method for making units of electrical heating cables, in particular heating cables having so-called "cold ends". Such cables are well known, the purpose of the cold ends being that when installed, the terminations and interconnections of the heating cables are displaced from the heated areas. Another purpose is that quite often the cable route leading from the switch or termination on a wall to the heated floor will pass over or through building sections which should not be heated.

A common construction of a heating cable includes a multiwire conductor of electrical resistance material such as constantan or similar Cu/Ni alloy, a layer of insulation material such as extruded and crosslinked polyethylene (PEX/XLPE), a metal layer such as an extruded lead sheath, and an outer protective layer of insulation material such as extruded PVC.

Usually there is also an earthing conductor placed between the lead sheath and the outer sheath. The "cold ends" most commonly used include a conductor with high conductivity such as an annealed single-wire or multiwire copper conductor, a layer of insulation material such as heat resistive PVC, a metal layer such as a lead sheath and an outer layer of insulation material such as PVC. A bare earthing conductor is usually placed between the lead sheath and the outer sheath.

In some cases an armour consisting for instance of a layer of galvanized steel wires is arranged over the outer sheath mentioned above. Outside the steel armour should be provided a corrosion protective layer of for instance extruded PVC. Such armour may be required on the heating part of the cable as well as on the cold ends.

Making heating cables with cold ends as described is a time consuming process. The process includes, for each unit, preparation of two full joints of the resistance conductor to the cold end conductor, completion of the conductor insulation, completion of the lead sheath and a joint of the earthing conductor (alternatively completion of the lead sheath is omitted) and finally completion of the outer layers. The insulation layers may be completed by shrinking a sleeve over the joint and over the two ends of cable sheaths. Usually the shrinkable sleeve is provided with an internal hot melt compound which fills all interstices of the joint when the sleeve is heated and shrunk. The result is usually a bulky joint which requires careful handling and which is susceptible to faults due to the difference in stiffness between the cables and the joints.

From German Pat. No. 12 50 026 it is known to make electrical heating cables in which pieces of electrical resistance conductors are soldered or welded to pieces of copper conductors so as to produce a continuous length of heating cable conductor which is provided with a continuous insulation layer and other protective layers and sheaths and which at a later stage is cut into predetermined sections of heating cables with "cold ends". There are not described any details of the soldering or welding processes used and most likely the described heating cable was never reduced to practice. Alternative examples of electrical heating cables are described in German Pat. Nos. 25 20 967, and 20 41 935, Swedish Pat. No. 219.971 and U.S. Pat. No. 3,538,482. The processes described are substantially different from that of the present invention and do not easily lend themselves to automatic production lines.

The main object of the present invention is to provide a method for automatic or semiautomatic manufacture of insulated wire or conductor and to overcome the drawbacks of the previously known jointing technique and joints.

The main features of the present invention appear from the attached claims.

By means of the present invention there is obtained an improved method which results in a better and more efficient product. The method itself drastically reduces the manpower required to produce insulated wire or conductor and in particular to produce a certain number of cold end heating cables.

Figure 2:
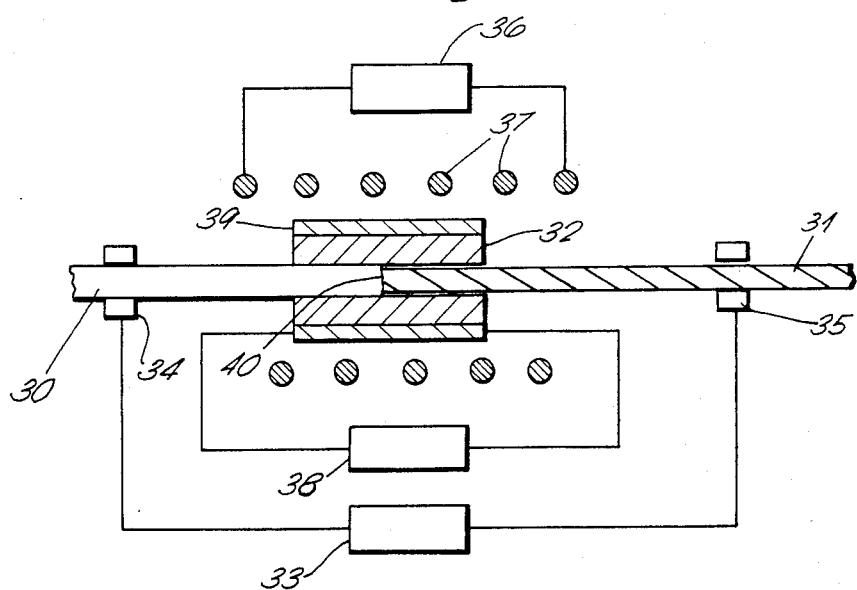

Above mentioned and other objects and features of the invention will clearly appear from the following detailed description of methods of producing cold end heating cables taken in conjunction with the drawings, where FIG. 1 schematically shows a block diagram illustrating an embodiment of the invention, and FIG. 2 schematically illustrates a preferred jointing apparatus.

In FIG. 1 is schematically illustrated a production line making use of the present invention. A supply 1 of resistance conductor, single wire or multiwire, feeds the resistance conductor 2 to a measuring and cutting device 3 from which predetermined lengths of resistance conductors 4 are fed to a jointing device 5. A supply 6 of cold end conductor similarly feeds this conductor 7 to a measuring and cutting device 8 from which predetermined lengths of cold end conductors 9 are also fed to the jointing device 5. The resistance conductor pieces 4 and cold end conductor pieces 9 are fed alternately to the jointing device 5, the length of each piece of cold end conductor corresponding to two cold ends.

The jointing process is performed by soldering, as will be described in more detail later. The ideal joint should be as strong as the conductor itself and the transition from one conductor to the other should not create weak spots. Furthermore, the joint should not at any point have a diameter substantially greater than the diameter of the larger one of the two conductors.

Upon serial jointing of resistance conductor pieces and cold end conductor pieces the continuous conductor 10 is fed to an insulation applicator 11 in which a layer of insulation material is extruded (or wound) onto the conductor. If the resistance conductor and the cold end conductor are of different crossection or diameter, say 1.5 mm$^2$ for the cold end and 0.84 mm$^2$ for the resistance conductor, some difficulties may arise in the insulation material applicator 11, in particular in connection with pressure extruders. This problem has been coped with by designing an extruder head which compensates for abrupt changes in the extruder pressure and provides an insulated composite conductor having a predetermined outer diameter. By using tubing technique an extruded hose may easily be adapted to the varying diameter of the conductor. It is considered advantageous, however, in order to facilitate the succeeding processes, to have an insulated composite conductor 12 having a constant diameter.

In order to overcome or at least reduce the problems encountered with insulation of a composite conductor having changes in the crossection and/or diameter, several solutions may be chosen in combination or separately:

- The transfer from one crossection/diameter to a different one may be tapered over a certain length of the joint, say 0.5 cm to 10 cm or even over a longer distance,
- the resistance alloy may be chosen such that the diameter of the resistance conductor substantially corresponds to that of the cold end conductor, while still giving a defined resistance per unit length,
- the resistance conductor may contain one or more "dummy" threads, filaments, or wires to give the desired diameter.

The insulating process may be done in tandem with the jointing procedures by for instance ensuring that the time taken up by the continued process of feeding and cutting of the conductors 2 and 7 as well as the jointing process corresponds to the speed at which the composite conductor 10 is fed to the extruder 11. The composite conductor 10 may of course alternatively be preliminary stored on reels before feeding it to the extruder 11. The insulated composite conductor 12 may then be fed to an optional metal layer applicator 13 such as a lead extruder or a lead (or other metal or laminate) tape applicator or a braided metal screen applicator. The metal clad insulated conductor 14 is fed to an outer insulation layer applicator 15 together with an optional earthing conductor 16 from a supply 17 of such conductor. If further protective layers are required such as armour and further corrosion protection, such layers may be provided in optional means 18.

In order to be able to cut the continuous cable 19 into heating cables with predetermined cold end lengths it must be possible one way or the other to detect the joints between the two types of conductor. There are available means 20 which are capable of detecting the position of the joint by e.g. detecting the change in conductor resistance. If necessary there may be attached a small piece of magnetic material or magnetizable material to the joint between the two conductors at station 5 so as to enhance the possibility of detection. The detection means 20 should also be provided with a marking device as for instance an ink applicator so that each joint can be marked on its outer sheath. Such detection and marking may also be done in two steps or twice, before and after the optional sheath applicator 18. Detection and marking could also be based on length measuring in station 5 and control signals from station 5 to operate the marking device of the means 20.

The marked cable 21 may be guided to a test device 22 testing for instance the outer sheath for pin holes or other defects. Electrical tests could be made in a separate station 23 on whole lengths of several hundreds or thousands of meters of composite cable before the cable is passed through a cutting station 24 and packing station 25. The cutting station 24 includes means for detecting the two joints and cutting the cold end midway between them so as to provide complete cold end heating cable units ready for packing.

The jointing process should be chosen to be compatible with the remainder of the production line and a special soldering process has been developed for the present electrical heating cable plant. This is schematically illustrated in FIG. 2.

With this process the two conductor ends 30, 31 are soldered together within a small sleeve 32 which is removed after the soldering has been completed. A silver soldering process is considered to give the best mode of operation. The solder as well as soldering flux, if required, may be prearranged within the sleeve before inserting the two conductor ends, one from each side. The jointing sleeve may be provided with a slightly greater bore in one end than in the other end so as to facilitate placement of the solder and flux at a predetermined place within the bore of the sleeve. The sleeve, the solder and the conductor ends are then heated during a predetermined heating cycle to obtain a joint which is smooth and strong and which does not require after-treatment like filing or grinding.

The necessary heating is obtained by high frequency heating of the joint area. A high frequency heating source 36 is indicated feeding power to a coil arrangement 37 having one or more windings. Supplementary heating may be obtained by for instance sending electrical current through the conductors at the jointing place. This is illustrated by a power supply 33 supplying current to bushings 34, 35. It will also be possible as a supplement to heat the sleeve by direct or close mechanical contact with a heating device 38, 39 separate from or combined with one or more of the mentioned heating means. Supplementary heating of the joint area may also be obtained by passing current through the cold end only. This could be done by connecting a current generator to the left hand bushing 34 and to a contact arrangement replacing the sleeves 32/39.

The heating arrangements should be so arranged and controlled as to give the joint area a heating cycle starting out with a quick rise in temperature. This temperature should be high enough to melt the solder 40, whereupon the power can be reduced while maintaining the solder melted and flowing until the conductor ends and the end portions are sufficiently wetted. The wires/conductors may be pretensioned towards each other within the sleeve during the soldering process so that when the solder becomes soft and melts, the wire/conductors will move into contact or into near contact. The movement of the wires/conductors into contact or near contact may be detected and used to cause at least one of the heating sources to be switched to a level of lower energy output. The heating cycle is completed by cutting off the power as soon as sufficient wetting is obtained. When conductor sizes in the order of $3 \times 0.5$ mm resistance conductor and 1.5 mm cold end conductor are used the heating cycle would last for a few seconds.

The purpose of the sleeve 32, which may be of a ceramic or semiconductive material, such as carbon, is to enable and ensure perfect alignment of the conductor ends during and after the jointing process. A further purpose of the sleeve is to aid in concentrating the heat to the jointing place. The heat reception of the jointing sleeve may be increased by plating it with a well conducting metal such as copper. It is furthermore important that the sleeve is made of a material which may be easily crushed and removed from the joint without interfering with the joint.

Means may be arranged to test the joint immediately after its completion, visually by a joint station operator and/or electrically at a separate station by inserting the joint into a test station where a test current is run through the joint. This could be done immediately before feeding the jointed conductor into the extruder 11.

In the case that one or both of the conductors are of the multiwire type, it may be advantageous to pre-twist or pre-solder the multiwire end portions to facilitate the succeeding jointing process. As mentioned it may also be practical to place or solder a small metallic sleeve of magnetizable material on the one or both of the conductor ends before jointing.

It should be clear that the method described above and defined in the claims may be automatic and continuous, but that the long line of steps may also be broken or interrupted at nearly any point or points if so desired to obtain a semiautomatic process. The degree of automation will depend upon the factory facilities available.

Whereas the present invention has been described above with reference to continuous manufacturing of single conductor electrical heating cables, it should be clear that the jointing process described could be used also for continuous manufacturing of any types of insulated wire or conductor when the bare wire or conductor is supplied from reels containing finite lengths of wire or conductor. In that case the device 3 and 8 can be omitted. The device 20 should also be omitted or modified.

It should be furthermore noted that the invention may be used also in connection with manufacturing of multiconductors by having multiple lay-outs 1–9 producing two or more conductors 10 to be insulated in the common insulation applicator 11. Two-conductor electrical heating cables may for instance be manufactured this way.

We claim:

1. A method for manufacturing a continuous conductor from conductor sections comprising the steps of:
    placing a jointing composition into a sleeve;
    positioning conductor sections to be joined in the sleeve in end-to-end relationship such that their adjacent ends border the jointing composition;
    heating the sleeve to a temperature at which the jointing composition becomes flowable and fuses the adjacent ends; and
    removing the sleeve.

2. The method as claimed in claim 1 wherein the placing and heating steps constitute a silver soldering process.

3. The method as claimed in claim 1 wherein the sleeve is of a substantially shape-retaining material.

4. The method as claimed in claim 3 wherein the material is carbon.

5. The method as claimed in claim 1 wherein the heating step includes a high frequency heating process.

6. The method as claimed in claim 1 further comprising, after the heating step, applying a current to the conductor in order to provide resistance heating to the ends to be joined.

7. The method as claimed in claim 6 further comprising, before the heating step, pretensioning the ends in the sleeve towards each other in order that they may be brought into contact when the jointing composition becomes flowable.

8. The method as claimed in claim 1 further comprising, before the heating step, pretensioning the ends in the sleeve towards each other in order that they may be brought into contact when the joining composition becomes flowable.

9. The method as claimed in claim 1 further comprising, prior to said placing step, plating the sleeve with an electrically conductive material.

10. The method as claimed in claim 8 wherein the conductive material is copper.

11. The method as claimed in claim 8 further comprising, after said pretensioning step, positioning a retaining member around the sleeve.

12. The method as claimed in claim 11 further comprising, after said positioning step, heating the retaining member.

13. The method as claimed in claim 8 further comprising, prior to said plating step, dimensioning the sleeve such that one end thereof has a larger diameter than the other end in other to facilitate placement of the jointing composition.

14. The method as claimed in claim 8 wherein, after movement of the ends adjacent each other in the sleeve, reducing the amount of heat in at least one of said heating and current applying steps.

* * * * *